(12) United States Patent
Nakajo et al.

(10) Patent No.: US 7,525,096 B2
(45) Date of Patent: Apr. 28, 2009

(54) MINIATURE CAMERA MODULE WITH LENS CONTAINING IMAGE SENSOR

(75) Inventors: Hironori Nakajo, Kawasaki (JP); Michio Sasaki, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/508,207

(22) Filed: Aug. 23, 2006

(65) Prior Publication Data

US 2007/0045550 A1    Mar. 1, 2007

(30) Foreign Application Priority Data

Aug. 24, 2005   (JP) .............................. 2005-243138

(51) Int. Cl.
*G01T 1/24*   (2006.01)
(52) U.S. Cl. ................................. 250/370.08
(58) Field of Classification Search ............. 250/370.08
See application file for complete search history.

(56) References Cited

U.S. PATENT DOCUMENTS

2004/0212719 A1* 10/2004 Ikeda .......................... 348/340
2005/0024752 A1* 2/2005 Webster ........................ 359/819
2005/0104991 A1* 5/2005 Hoshino et al. ............. 348/340
2005/0237418 A1* 10/2005 Sakamoto .................... 348/340
2005/0248684 A1  11/2005 Machida
2006/0164539 A1* 7/2006 Van Arendonk et al. ...... 348/340
2006/0251414 A1* 11/2006 Nishizawa ................... 396/275

FOREIGN PATENT DOCUMENTS

| CN | 1433630 | 7/2003 |
| --- | --- | --- |
| CN | 1460874 | 12/2003 |
| CN | 1534999 | 10/2004 |
| JP | 2004-88181 | 3/2004 |
| KR | 10-2005-0034473 | 4/2005 |
| WO | 2004/098174 | 11/2004 |
| WO | 2005/034508 | 4/2005 |

* cited by examiner

*Primary Examiner*—David P Porta
*Assistant Examiner*—Marcus H Taningco
(74) *Attorney, Agent, or Firm*—Oblon, Spivak, McClelland, Maier & Neustadt, P.C.

(57) ABSTRACT

An image sensor is mounted on a substrate. A base is further formed on the substrate. The base has an opening above the image sensor. A filter is fixed to the opening of the base. The filter has a projecting dam member in a peripheral portion thereof. A lens barrel holding lenses is disposed on the filter.

9 Claims, 2 Drawing Sheets

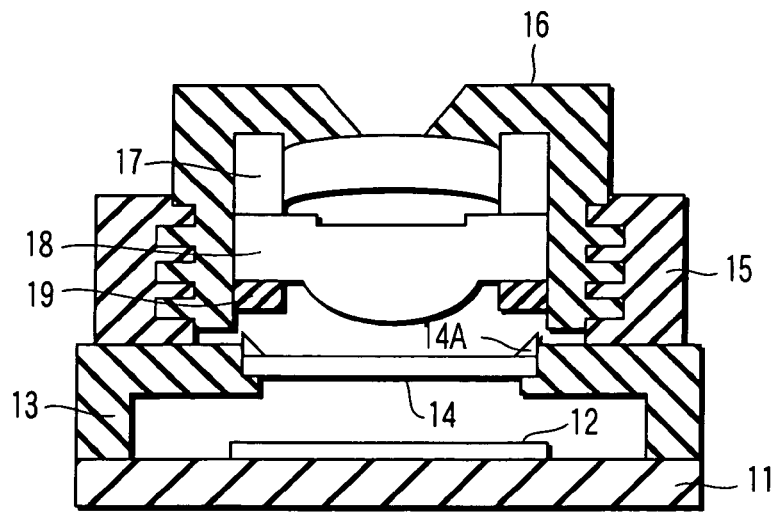
F I G. 1
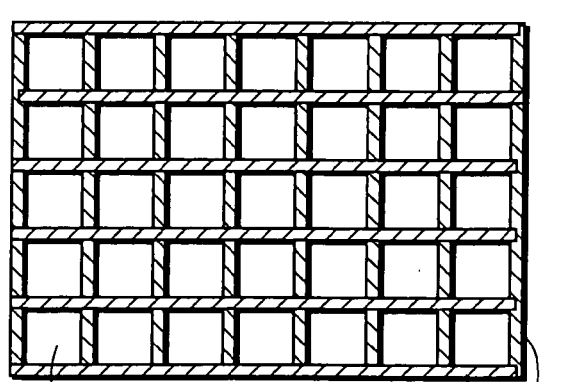
F I G. 2A
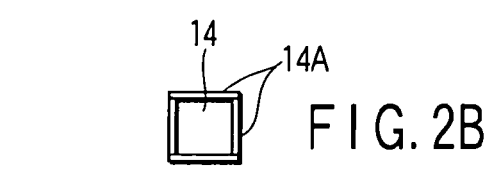
F I G. 2B
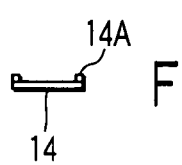
F I G. 2C

MINIATURE CAMERA MODULE WITH LENS CONTAINING IMAGE SENSOR

CROSS-REFERENCE TO RELATED APPLICATIONS

This application is based upon and claims the benefit of priority from prior Japanese Patent Application No. 2005-243138, filed Aug. 24, 2005, the entire contents of which are incorporated herein by reference.

BACKGROUND OF THE INVENTION

1. Field of the Invention

This invention relates to a miniature camera module with a lens containing an image sensor such as a charge coupled device (CCD) or a CMOS sensor.

2. Description of the Related Art

Recently, there has been developed a miniature camera module with a lens containing an image sensor such as a CCD or a CMOS sensor (e.g., refer to Jpn. Pat. Appln. KOKAI Publication No. 2004-88181). The miniature camera module is incorporated in a mobile telephone, a portable information terminal or the like and thus commercialized.

The miniature camera module generally has, on an image sensor, a filter such as a cover glass or an infrared rays (IR) cut filter, or an optical low pass filter. This filter serves to seal a space over the image sensor and reduce defects due to dust produced in the second half of an assembly process, and to achieve natural color reproducibility by use of a non-reflective coat or an infrared rays cut coat deposited on the cover glass.

One problem heretofore associated with such a filter is defects due to moving dirt produced after the assembly. This is a problem in which even if a product is judged as nondefective in a test before shipment, dust present in the tube moves to an effective area during transportation or during use in the market to cause defects such as dark flaws or stains. The source of such moving dirt includes, for example, chippings of the IR cut filter, the seepage of an adhesive used when bonding the IR cut filter to a base, or dust produced from a screw portion when a lens barrel is moved.

BRIEF SUMMARY OF THE INVENTION

A miniature camera module of the present invention viewed from a first aspect comprises: an image sensor mounted on a substrate; a base formed on the substrate, the base having an opening above the image sensor; a filter fixed to the opening of the base, the filter having a projecting dam member in a peripheral portion thereof; and a lens barrel disposed on the filter and holding lenses.

A miniature camera module of the present invention viewed from a second aspect comprises: an image sensor mounted on a substrate; a base formed on the substrate, the base having an opening above the image sensor and having a projecting portion in the vicinity of the opening; a filter fixed to the opening of the base; and a lens barrel disposed on the filter and holding lenses.

A miniature camera module of the present invention viewed from a third aspect comprises: an image sensor mounted on a substrate; a base formed on the substrate, the base having an opening above the image sensor and having a groove portion in the vicinity of the opening; a filter fixed to the opening of the base; and a lens barrel disposed on the filter and holding lenses.

BRIEF DESCRIPTION OF THE SEVERAL VIEWS OF THE DRAWING

FIG. 1 is a sectional view showing the configuration of a miniature camera module in a first embodiment of the present invention;

FIGS. 2A, 2B and 2C are schematic diagrams showing a method of manufacturing an IR cut filter 14 in the miniature camera module in the first embodiment;

DETAILED DESCRIPTION OF THE INVENTION

Figure 3:
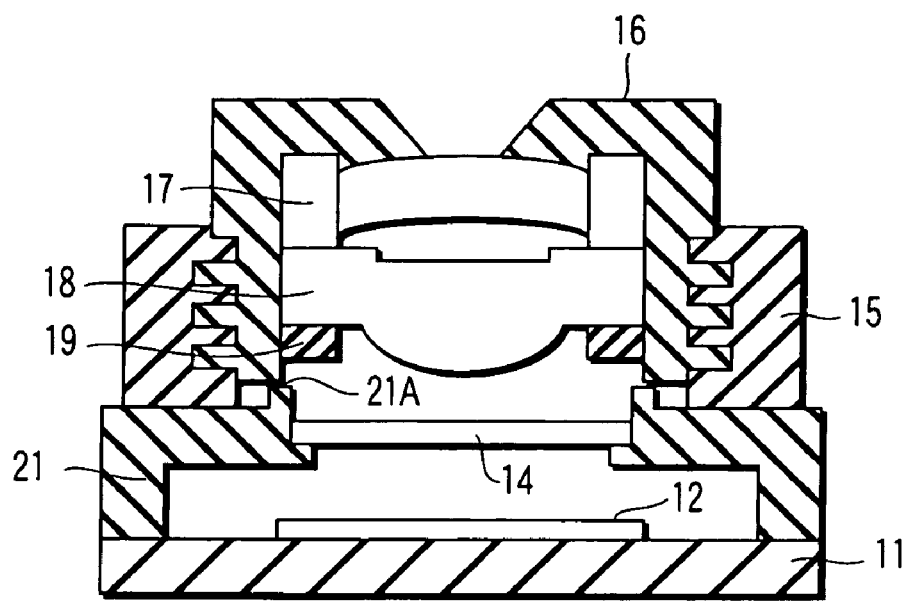
FIG. 3 is a sectional view showing the configuration of a miniature camera module in a second embodiment of the present invention.

Embodiments of this invention will hereinafter be described with reference to the drawings. In the description, common reference numerals are assigned to common parts throughout the drawings.

First Embodiment

A miniature camera module in a first embodiment of this invention will be described.

FIG. 1 is a sectional view showing the configuration of the miniature camera module in the first embodiment.

As shown in FIG. 1, the miniature camera module comprises a substrate 11, an image sensor chip 12, a base 13, an IR cut filter 14, a lens holder 15, a lens barrel 16, a first lens 17, a second lens 18 and a lens stopper 19. A CCD, a CMOS sensor or the like is used for the image sensor chip 12. The IR cut filter 14 is a filter for cutting predetermined infrared rays.

The image sensor chip 12 is mounted on the substrate 11. Further, the base 13 is formed on the substrate 11 and above the image sensor chip 12. The base 13 has an opening above the image sensor chip 12. The IR cut filter 14 is firmly fixed to the opening of the base 13, and a projecting dam member 14A is formed in a peripheral portion of the IR cut filter 14. Here, the base 13 and the IR cut filter 14 seal a space over the image sensor chip 12. Moreover, an ordinary potting member or an adhesive such as an epoxy resin may be used for the dam member 14A.

A lens holder 15 is formed on the base 13. Further, the lens barrel 16 has a diaphragm, and holds the first lens 17 and the second lens 18. In other words, the lenses 17 and 18 are fixed to the lens barrel 16 by the lens stopper 19 so that light which has passed through the diaphragm of the lens barrel 16 enters the lenses 17 and 18. A screw is formed by the lens holder 15 and the lens barrel 16, and the movement of this screw brings the lens barrel 16 up and down to adjust the position of the lenses 17 and 18. It is to be noted that the base 13 and the lens holder 15 are separately formed in the case shown here, but they may be integrally formed.

The lenses 17 and 18, the IR cut filter 14 and the image sensor chip 12 are arranged on an optical axis, and the light which has passed through the diaphragm of the lens barrel 16 passes through the lenses 17 and 18, and further passes through the IR cut filter 14 and then imaged on the surface of the image sensor chip 12.

In the miniature camera module having such a configuration, the projecting dam member 14A is formed in the peripheral portion of the IR cut filter 14. This dam member 14A prevents chippings of the IR cut filter 14, the seepage of the adhesive used when bonding the IR cut filter 14 to the base 13, or moving dirt such as dust produced from the screw portion for moving the lens barrel 16 from moving on the IR cut filter 14. Thus, even if a product is judged as nondefective in a test before shipment, it is possible to reduce defects resulting from dust present in the tube which moves to an effective area during transportation or during use in the market to cause dark flaws or stains.

Next, a method of manufacturing the IR cut filter 14 having the dam member 14A will be described. Generally, the IR cut filter 14 is produced by dividing a glass plate referred to as Oban or a large size into pieces of a required size. In order to divide the glass plate, a dicing device is used which is used to cut a wafer in a general assembly process of a semiconductor.

FIG. 2A is a plan view of the glass plate, FIG. 2B is a plan view of the divided IR cut filter 14, and FIG. 2C is a sectional view of the IR cut filter 14.

First, as shown in FIG. 2A, a dam member 20A is formed in a latticed manner on a glass plate 20. An ordinary potting member or an adhesive such as an epoxy resin may be used for the dam member 20A. Then, the glass plate 20 is cut from the top of the dam member 20A by dicing, thereby producing the individual IR cut filter 14, as shown in FIG. 2B. At this moment, the width of the dam member 20A can be set to a predetermined width larger than the width of a dicing blade so that the dam member 14A remains in the form of a fringe in the peripheral portion of the IR cut filter 14 after the dicing.

As described above, according to the first embodiment, the dam member 14A formed in the peripheral portion of the IR cut filter 14 can prevent moving dirt produced after the assembly from moving to the effective area. This makes it possible to reduce defects such as the dark flaws or stains caused by the moving dirt produced after the assembly.

Second Embodiment

Next, a second embodiment of this invention will be described. The same numerals are assigned to parts similar to those in the configuration of the first embodiment, and such parts are not described.

FIG. 3 is a sectional view showing the configuration of a miniature camera module in the second embodiment.

A base 21 is formed on a substrate 11 and above an image sensor chip 12 in the miniature camera module in the second embodiment. The base 21 has an opening above the image sensor chip 12, and a projecting portion 21A is formed in the vicinity of the opening. Further, an IR cut filter 14 is firmly fixed to the opening of the base 21. In other respects, the configuration is similar to that of the miniature camera module in the first embodiment.

In the miniature camera module having such a configuration, the projecting portion 21A is formed in the vicinity of the opening of the base 21. This projecting portion 21A prevents chippings of the IR cut filter 14, the seepage of an adhesive used when bonding the IR cut filter 14 to the base 21, or moving dirt such as dust produced from a screw portion for moving a lens barrel 16 from moving on the IR cut filter 14. Thus, even if a product is judged as nondefective in a test before shipment, it is possible to reduce defects resulting from dust present in the tube which moves to an effective area during transportation or during use in the market to cause dark flaws or stains.

Third Embodiment

Next, a third embodiment of this invention will be described. The same numerals are assigned to parts similar to those in the configuration of the first embodiment, and such parts are not described.

Figure 4:
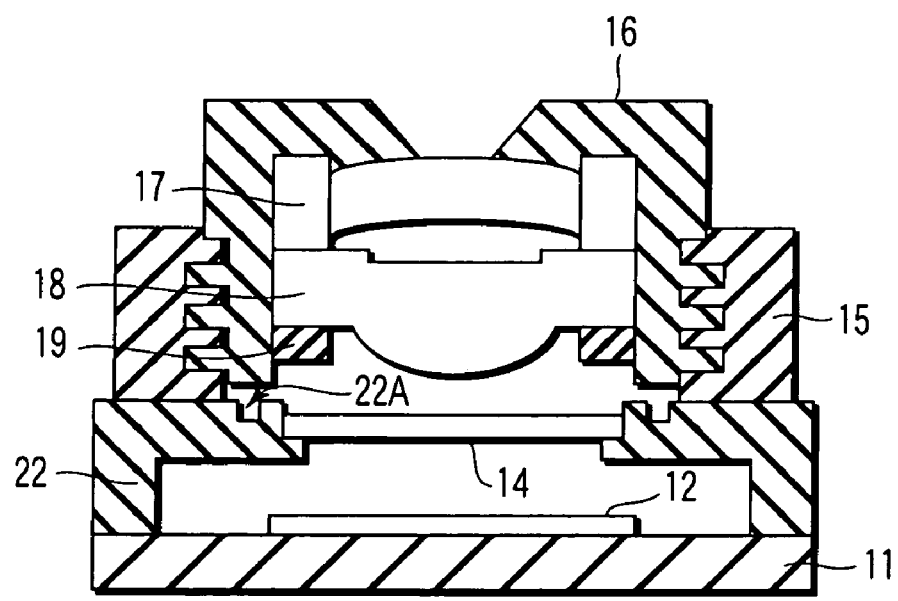
FIG. 4 is a sectional view showing the configuration of a miniature camera module in a third embodiment of the present invention.

FIG. 4 is a sectional view showing the configuration of a miniature camera module in the third embodiment.

A base 22 is formed on a substrate 11 and above an image sensor chip 12 in the miniature camera module in the third embodiment. The base 22 has an opening above the image sensor chip 12, and a groove portion (depressed portion) 22A is formed in the vicinity of the opening. Further, an IR cut filter 14 is firmly fixed to the opening of the base 22. In other respects, the configuration is similar to that of the miniature camera module in the first embodiment.

In the miniature camera module having such a configuration, the groove portion 22A is formed in the vicinity of the opening of the base 22. This groove portion 22A prevents chippings of the IR cut filter 14, the seepage of an adhesive used when bonding the IR cut filter 14 to the base 22, or moving dirt such as dust produced from a screw portion for moving a lens barrel 16 from moving on the IR cut filter 14. Thus, even if a product is judged as nondefective in a test before shipment, it is possible to reduce defects resulting from dust present in the tube which moves to an effective area during transportation or during use in the market to cause dark flaws or stains. That is, in each of the embodiments described above, all that is required is that a projection (or groove) is provided between the base and the filter to prevent the adhesive or moving dirt from moving on the IR cut filter 14.

According to the embodiments of this invention, it is possible to provide a miniature camera module capable of reducing defects such as the dark flaws or stains caused by the moving dirt produced after the assembly.

Furthermore, the embodiments described above can be carried out not only independently but also in a suitable combination. Moreover, the embodiments described above include various stages of inventions, and a proper combination of a plurality of constituent requirements disclosed in the embodiments makes it possible to extract the various stages of inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A camera module comprising:
    an image sensor mounted on a substrate;
    a base formed on the substrate, the base having an opening above the image sensor;
    a filter fixed to the opening of the base, the filter having a projecting dam member in a peripheral portion thereof; and
    a lens barrel disposed on the filter and holding lenses,
    wherein the dam member is projected in a direction in which the lenses are disposed and is also projected from a top surface of the filter, a top of the dam member is higher than a top surface of the base, the top surface of the base is higher than the top surface of the filter, the filter is in contact with a side of the opening of the base, and the base supports the lens barrel.

2. The camera module according to claim 1, further comprising:
    a holder formed on the base,
    wherein a screw portion is formed by the holder and the lens barrel, and the lens barrel moves in the screw portion to adjust the position of the lenses.

3. The camera module according to claim 1,
wherein the lens barrel has a diaphragm, and light which has entered from the diaphragm passes through the lenses and the filter and then imaged on the image sensor.

4. The camera module according to claim 1,
wherein the dam member includes any one of a potting member and an epoxy resin.

5. The camera module according to claim 1,
wherein the filter includes an IR cut filter which cuts infrared rays.

6. A camera module comprising:
an image sensor mounted on a substrate;
a base formed on the substrate, the base having an opening above the image sensor and having a projecting portion in the vicinity of the opening, the projecting portion being projected in a direction perpendicular to a surface of the substrate;
a filter fixed to the opening of the base; and
a lens barrel disposed on the filter and holding lenses, and the projecting portion being also projected from a top surface of the base, a top of the projecting portion being higher than the top surface of the filter,
wherein the top surface of the base is higher than the top surface of the filter, the filter is in contact with a side of the opening of the base, and the base supports the lens barrel.

7. The camera module according to claim 6, further comprising:
a holder formed on the base,
wherein a screw portion is formed by the holder and the lens barrel, and the lens barrel moves in the screw portion to adjust the position of the lenses.

8. The camera module according to claim 6,
wherein the lens barrel has a diaphragm, and light which has entered from the diaphragm passes though the lenses and the filter and then imaged on the image sensor.

9. The camera module according to claim 6,
wherein the filter includes an IR cut filter which cuts infrared rays.

* * * * *